April 23, 1968 T. RAGLAND 3,380,025

MICROPROGRAMMED ADDRESSING CONTROL SYSTEM FOR A DIGITAL COMPUTER

Filed Dec. 4, 1964 Sheets-Sheet 1

INVENTOR
THOMAS RAGLAND

BY David N. Koffsky

ATTORNEY

United States Patent Office 3,380,025

Patented Apr. 23, 1968

3,380,025

MICROPROGRAMMED ADDRESSING CONTROL SYSTEM FOR A DIGITAL COMPUTER

Thomas Ragland, Fishkill, N.Y., assignor to International Business Machines Corporation, New York, N.Y., a corporation of New York

Filed Dec. 4, 1964, Ser. No. 415,887

13 Claims. (Cl. 340—172.5)

ABSTRACT OF THE DISCLOSURE

A microprogrammed digital computer is provided with a fixed-width read-only memory microinstruction storage system wherein the memory word length is shorter than the longest possible combination of bits resulting from a combination of a current microinstruction and a next microinstruction address. Certain microinstructions have a long next microinstruction address, thereby providing a wide range of addressable storage positions from which to access the next microinstruction, but constraining the number of bit positions allocated to the current instruction portion so that its ability to control various operations within the data processing system is relatively small. For other microinstructions which require considerable control capability and therefore require the maximum number of current instruction bits, the number of bits allocated to the next microinstruction address is accordingly limited.

This invention relates to a program controlled data processing system and more particularly to a microprogrammed data processing system wherein the microprogram storage means is minimized.

A microprogrammed computer is one in which the programmer retains extensive control over the gating of data within the machine. What is now called the control section in some data processing systems, is replaced by the programmer who actually determines which gates are opened and the time sequencing of these gates to accomplish desired instructions. Each of these elemental gating instructions is called a microinstruction and by specifying a list of these, the programmer can accomplish useful operations.

Each microinstruction is generally composed of two portions, the first portion being a coded control manifestation which specifies the current operation to be accomplished and the address of the data upon which the operation is to be performed (if required); and a second portion which is a digital code specifying the address of the next control manifesting microinstruction. The manner of coding the first portion of a microinstruction is somewhat arbitrary with several methods presently in use. One coding concept allocates preset numbers of digits to the operation code (OP code) and each distinct register or position which a microinstruction might desire to control. Another coding concept makes no allocation of digits to the OP code but rather uses unused addressing capability in combination with extra added bits to designate various operations. For instance, if a system has twelve registers, four binary bits are required to address any one register (0–11); but along with this capability comes four unused combinations of bits (e.g., 12–15) which may be employed as OP code indicators. It is sometimes necessary to allocate extra bits to fill out the OP code indicating capability in the second coding technique. The latter manner of coding consumes less storage space than the first, but requires additional decoding ability.

Microinstructions may be stored in normal read-write memories but this is a far from optimum configuration since a complete memory cycle is required to retrieve each microinstruction and hundreds of microinstructions may be required to perform an operation. To avoid this problem, microinstructions are generally stored in read only memories which provide large capacity storage capable of readout at relatively fast rates.

Since the cost of a read only memory is directly related to the number of bit positions in each storage word, it is obviously desirable to provide as few storage positions as possible. As aforestated, a microinstruction includes two portions; the current instruction portion containing an OP code, current data addresses, and a second portion being the address of the next microinstruction. The bit length of the next microinstruction address is generally made sufficiently long to allow access to any microinstruction within the read only memory. For instance, in a read only memory which has 8,000–16,000 microinstructions, a 14 bit address is required. The bit length of the current instruction portion of a microinstruction can vary from a single bit to an indeterminate number of bits, with the limiting factor being the amount of control desired from the microinstruction. In one system, which will be hereinafter discussed, the current microinstruction bit length varies from 3–11 bits.

It can be seen for the above case, that a fixed "width" read only memory having 8,000–16,000 storage positions needs a total microinstruction word length of 11+14 or 25 bits to accommodate the combination of the longest current instruction portion and the full address of the next microinstruction. Using a read only memory this "wide" is wasteful, however, since the current instruction portion often requires less bits than maximum and thereby leaves unusued bit positions in a fixed width read only memory.

Accordingly, it is an object of this invention to provide an improved control apparatus for a data processing system.

It is another object of this invention to provide an improved microinstruction storage system for controlling the operation of a data processing system.

It is a further object of this invention to provide an improved microinstruction storage system wherein the storage facilities of the storage means are efficiently utilized.

It is still another object of this invention to provide a fixed-width read only memory microinstruction storage system wherein the memory word length is shorter than the longest possible combination of bits resulting from a combination of a current microinstruction and a next microinstruction address.

In accordance with the above-stated objects, it has been found in the normal sequence of operations in a microprogrammed data processing system, that succeeding microinstructions in any specific subroutine are often located in sequential memory positions. Accordingly, the address of a succeeding microinstruction differs from the preceding microinstruction address only by certain low order bits. It has additionally been found that many microinstructions do not require the ability to access all positions within the read only memory, but rather, only require limited access within specific areas of the memory relative to their own storage positions. This invention makes use of these findings by assigning to certain operation codes, a restricted number of accessible memory positions. More specifically, a compromise is made by allowing certain microinstructions a long next microinstruction address, thereby providing a wide range of addressable storage positions from which to access the next microinstruction, but constraining the number of bit positions allocated to the current instruction portion so that its ability to control various operations within the data processing system is relatively small. On the other hand, for microinstructions which require considerable control capability and therefore require the maximum number of current instruction bits, the number of bits allocated to the next microinstruction address are limited. In all cases, a preset number of bits are allocated to the next microinstruction address portion to allow at least a minimum addressing capability for any microinstruction.

Notwithstanding the fact that certain microinstructions are provided with a restricted number of address bits for the next microinstruction address, a full number of address bits are still required to be supplied to the memory address register to access a position in memory. This invention provides means for retaining in the memory address register the address of the present microinstruction until a decoder examines a portion of the accessed microinstruction to determine how many next microinstruction address bits it contains. Then, in accordance with this determination, the new next microinstruction bits replace those presently in the memory address register, while retaining all those not replaced. In this manner a complete new microinstruction address is formed.

Broadly, the invention provides a control means which examines a portion of a current control manifesting signal derived from a storage means in response to the signal's storage position being accessed by an input means under control of a position indicator. In accordance with this examination, the control means causes to be replaced in the input means at least a portion of the storage position indicator for the current control manifesting signal with a new position indicator so that the present and new position indicator manifestations combine to produce a complete position indicator for a new control manifestation. If a point is reached in a given sequence of operations where there is a requirement to access a position in the storage means which is not within the capability of a specific control manifestation, a special manifestation is interposed to provide the capability.

The foregoing and other objects, features and advantages of the invention will be apparent from the following more particular description of a preferred embodiment of the invention, as illustrated in the accompanying drawings.

Figure 1:
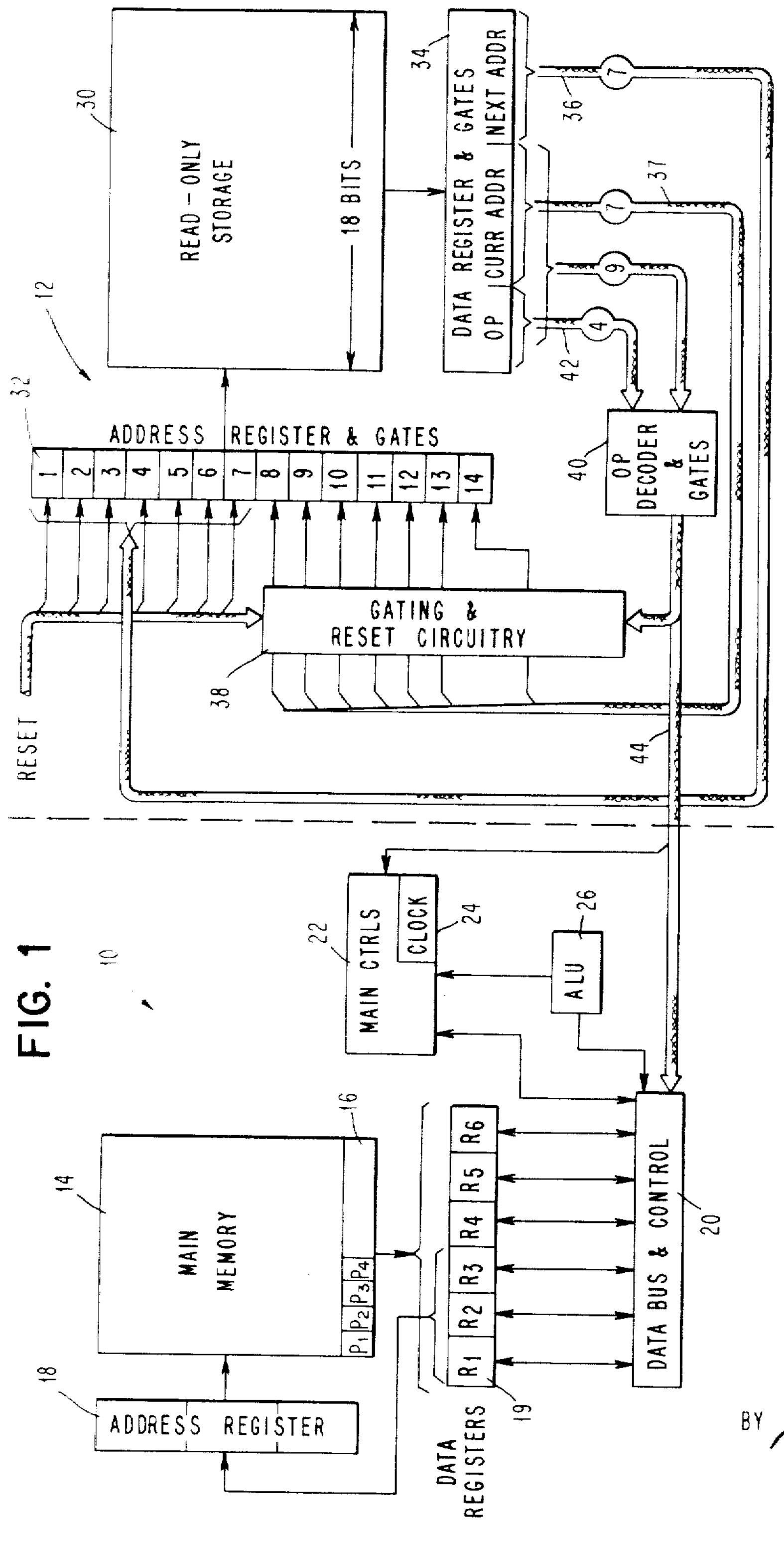
FIG. 1 is a block diagram of a data processing system which incorporates the invention.

The data processing system of FIG. 1 can be divided into two main sections, a data handling and storage section 10 and a microinstruction control section 12. Within data handling and storage section 10 is included all of the necessary apparatus to perform desired arithmetical and logical operations upon a user's data. Main memory 14 forms the heart of this section and is a random access, high speed storage device. As exemplary, main memory 14 may be hereinafter considered to be a random access magnetic core memory matrix having a multiplicity of planes which are capable of storing and reading out a large amount of data. For illustrative purposes, a single plane 16 is illustrated as being provided with a number of bit storage positions P1–P4. Reading from and writing into main memory 14 is accomplished via address register 18. The data read from main memory 14 may be inserted into any of a number of data registers, of which 6 are shown as representative (R1–R6). Data registers R1–R6 are also utilized as general registers within the processing system and are capable of accepting data from any source within the machine irrespective of its origin. In addition, certain of the data registers, e.g., R1–R3, may be combined to compile a main memory address for insertion into address register 18. This feature will be described more in detail hereinafter in regards to a "Fetch" microinstruction.

The routing of data and instructions between various of the registers and other portions of the system is accomplished in data bus and control 20. This area of the system contains multiple conductor bus lines and gating circuits which control the inputs to and the outputs from substantially all of the system components in data handling and storage section 10. Also connected to data bus and control 20 are main controls 22 which provide necessary control functions such as on-off, mode control, etc., that are not provided by the microinstruction control section 12. Clock 24 forms a portion of main controls 22 and provides the master timing signals from which all of the various required control potentials, and gating signals are generated. Also connected both to main control 22 and to data bus and control 20 is arithmetic-logic unit 26 which performs data manipulations of an arithmetic or logical form.

Turning now to microinstruction control section 12, all microinstructions are stored in an 18 bit wide, read only storage 30. The specific type of read only storage (ROS) utilized is a matter of choice and any of the well-known types may be used, e.g., card-capacitor, transformer, etc. In addition, the specific bit width (18) is chosen only for illustrative purposes and it should be obvious that ROS 30 can be made as wide or as narrow as necessary. If it is assumed that a card-capacitor ROS is employed, it is punched prior to its insertion in the data processing machine in accordance with the microinstructions desired to be stored therein. Thus when address and sense lines are laid thereon, only where holes are punched will capacitive couplings take place to achieve a data read out.

The input means for ROS 30 are supplied by address register and gates 32. If it is assumed that there are 8,000–16,000 stored microinstructions in ROS 30, then at least 14 binary bits of address data must be provided, to access any one microinstruction. For this reason, address register and gates 32 is provided with 14 separate binary triggers which are capable of either being set to the 1 or 0 state in accordance with applied discrete input levels.

As each microinstruction is accessed in ROS 30 and read out, it is inserted into an output means comprising data register and gates 34. Data register and gates 34 contain a sufficient number of binary triggers to receive and hold all bits of a single microinstruction read out of ROS 30 (18 binary triggers).

Before proceeding to discuss the remaining portions of microinstruction control section 12, the microinstruction format and several representative microinstructions will be described. A microinstruction is basically a control manifestation composed of two main sections; the first being a current control manifestation which includes an OP code and current data addresses; the second section containing a position indicator which signifies the address of the next microinstruction. The function of each of these portions of a microinstruction will become clear as the several representative microinstructions are described. Referring now FIG. 2, the "move R5 to R6" microinstruction accomplishes the movemen of data contained in data register R5 to data register R6. The 4 bit OP code (bits 15–18) provides the necessary coding so that control potentials are created to accomplish the data movement. Bits 12–14 specify the register from which the data is to be moved and bits 9–11 specify the register to which the data is to go. The remaining bits (designated as *a*) signify the address of the next microinstruction to be performed. Note that this address only encompasses 8 bits (1–8) and has a maximum addressing power of 256 microinstruction storage positions in ROS 30. It has been found that the "move" microinstruction is one type which does not require a large random addressing capability due to the fact that such an instruction is normally followed in sequence or very nearly thereto by the next instruction to be performed. Thus bits are required only in the low order bit positions, to describe the address of the next microinstruction. Nevertheless, since ROS 30 (FIG. 1) is provided with more than 8,000 storage positions, each of which requires a minimum of 14 bits of address, certain bits must be added to the high order bit position of the next instruction address portion of the "move" microinstruction to allow location of the next microinstruction. As will be described hereinafter, this feature is accomplished by preventing the loss of certain of the bits in the prior microinstruction address contained in address register and gates 32. Thus, when the next microinstruction address portion of the "move" microinstruction is inserted into the respective bit positions of address register and gates 32, the missing high order bits are supplied by the remaining high order bits from the prior address. As can be seen from the foregoing, the "move" microinstruction has the inherent capability of addressing any of the 256 microinstruction within a group of microinstructions designated by the previous high order microinstruction address bits. As will become presently apparent, other microinstructions have greater or lesser addressing capability.

Figure 2:
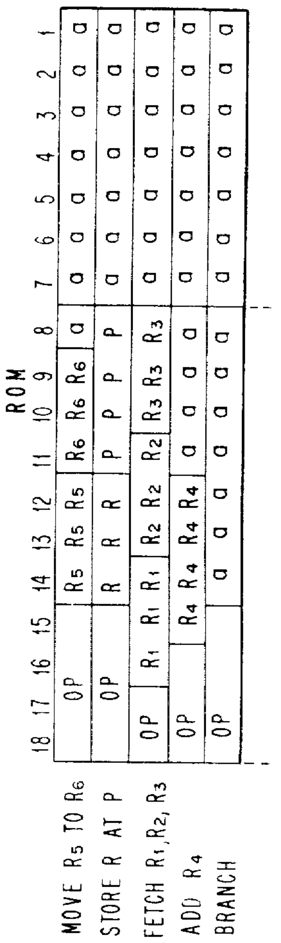
FIG. 2 is a chart showing various control manifesting microinstructions which may be used with the invention.

The "store" microinstruction shown in FIG. 2 simply designates the data stored in data register R2 for storage at position P in plane 16 of main memory 14. Note here, that 7 bits (1–7) are available for the next microinstruction address allowing only 128 distinct ROS positions to be accessed by this microinstruction. A similar addressing capability appears in the "fetch" microinstruction which has an abbreviated OP code and basically designates the data held in data registers R1, R2 and R3 to be transferred to address register and gates 18 for the purpose of synthesizing and address for main memory 14. Arithmetical microinstructions have been found to require large successive addressing capabilities. For this reason, special registers are included within arithmetic logic unit 26 to hold either an addend or augend so that by merely specifying one of the data registers, e.g., R4, the data therefrom can automatically be added to whatever is presently held in ALU 26 and the result returned to register R4. This entire operation is controlled by the control potentials resulting from the decoding of the "add" OP code. As can be seen, the "add" microinstruction is provided with 11 next microinstruction address bits to allow access to 2,048 ROS positions.

The situation may occur where a new microinstruction address is not within the addressing capability of the present microinstruction. In this case, a branch microinstruction is inserted which has the capability (14 bits) of addressing any position in ROS 30. In this manner, the prior high-order stored address bits held in address register and gates 32 can be replaced at any time by merely inserting the branch microinstruction in the operation sequence.

As can be seen from the above, each microinstruction has a minimum ability to address any of the preset number of microinstruction address positions within a group of positions thereby always providing a predetermined amount of branching ability. In this illustrative case, at least 7 next microinstruction address bits are allocated to a microinstruction so that a group of 128 different address positions are always accessible thereto. This feature is implemented in FIG. 1 where the 7 low order bits of data register and gates 34 are fed via cable 36 directly into bit positions 1–7 of address register and gates 32. On the other hand, the next higher order 7 bit positions from data register and gates 34 are fed via cable 37 into gating and reset control circuitry 38 which controls the status of the 7 high order triggers of address register and gates 32. The means for controlling gating and reset circuitry 38 is provided by OP decoder and gates 40. The input to OP decoder and gates 40 is provided via cable 42 over which all OP code bits are transmitted. By decoding the specific operation code, OP decoder and gates 40 automatically determines which positions of address register and gate 32 must be retained for the next addressing cycle and in accordance therewith, provides control potentials to the gating and reset circuitry 38. In addition, OP decoder and gates 40 provide the decoded operating code and current address bits to data handling and storage area 10 via cable 44.

In summary, a space saving in read only storage 30 is achieved by reading into the ROS address registers, only the low order address bits for the next microinstruction which may be different from those of a previous instruction address. The ROS address register saves the high order bits from the previous microinstruction address with the result that the register still contains all the necessary bits for addressing any location in memory. If a point is reached in a given program where it is impossible to place an OP code with its necessary addressing capabilities in combination with the required next microinstruction address in a single microinstruction, then a branch instruction is included which provides the necessary addressing capability.

Figure 3:
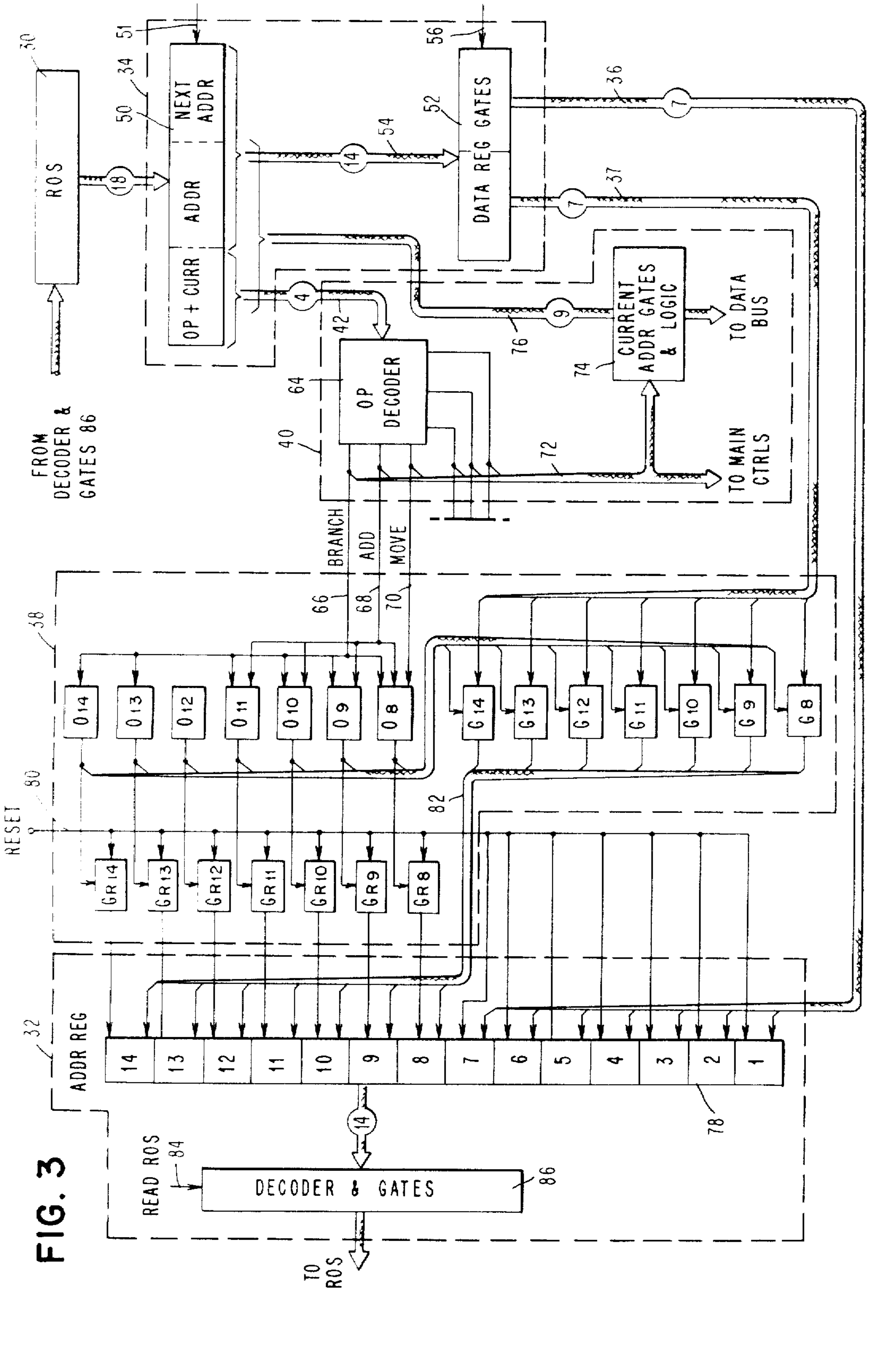
FIG. 3 is a more detailed block diagram of a portion of the system of FIG. 1.

In FIG. 3, the detailed logical circuitry of microinstruction control section 12 is shown. Included within data register and gates 34 is data register 50 and data register gates 52. The fourteen low order bits of data register 50 are fed via cable 54 to data register gates 52. Data register gates 52 are provided with a gating control input line 56 which upon energization, gates the seven high order bits and seven low order bits from data register 50 onto cables 36 and 37, respectively.

The four high order bit positions in data register 50 (which encompass the longest OP code) are fed via cable 42 to OP decoder 64. OP decoder 64 is provided with an output line corresponding to each specific OP code contained in read only storage 30. It also contains circuitry which decodes the specific OP code fed to it from data register 50 and energizes a corresponding output line. For exemplary purposes, only three output lines are specifically identified, they being "branch" output 66, "add" output 68 and "move" output 70. Each of these output lines is fed to gating and reset circuitry 38 to control the transmission of the next microinstruction address bits from data register gates 52 to address register and gates 32. In addition, the output lines from OP decoder 64 are fed via cable 72 to main controls 22 (FIG. 1) and also to current address and logic gates 74. Another input to current address gates and logic 74 is via cable 76 which transmits all possible bit positions of data register 50 that may contain current address bits (bit positions 8–16). In accordance with the specific OP code output from OP decoder 64, current address gates and logic 74 transmits to data bus and control 20 only those bits in data register 50 which are actually current address bits.

As aforementioned, the seven low order bits of a microinstruction invariably contain the low order address bits for the next microinstruction. For this reason, the seven low order bits from data register 50 are gated by data register gates 52 onto cable 36 and thence placed directly in the low order seven bit positions of address register 78. On the other hand, the next higher order seven bits may either be the address bits of the next microinstruction, or current address bits needed for the current microinstruction.

The determination of which bits are current address bits and which are next address bits is made when OP decoder 64 energizes one of its output lines. Each output line from OP decoder 64 which corresponds to a microinstruction wherein next microinstruction address bits extend into the current data address field (second seven high order bit positions) is fed to one or more OR circuits $O_8$–$O_{14}$. The outputs from each of OR circuits $O_8$–$O_{14}$ are fed to corresponding gates $G_8$–$G_{14}$ and to reset gates $G_{R8}$–$G_{R14}$. A reset line 80 provides the other input to each of gates $G_{R8}$–$G_{R14}$ and is also applied directly to the binary storage positions 1–7 of address register 78.

The output from each of reset gates $G_{R8}$–$G_{R14}$ is applied to its corresponding address register binary storage position (i.e., binary positions 8–14). Also applied as inputs (via cable 82) to binary positions 8–14 in address register 78, are the respective outputs from gates $G_8$–$G_{14}$. The inputs to gates $G_8$–$G_{14}$ are derived from cable 37 which transmits the seven high order bits from data register gate 52.

Before describing the operation of the circuit, reference should be made to FIG. 2 where it can be seen that once a specific OP code in a microinstruction is identified, the number of bit positions occupied by the next microinstruction address in the current address field is automatically known. For instance, in the "move" microinstruction, only one bit of the current address field (bit 8) is so occupied; whereas in the "add" microinstruction, the four low order bits of the current address field are so occupied (bits 8–11). In the "branch" microinstruction, all positions in the current address field are occupied by the next microinstruction address bits. This decoded information is utilized by causing each output line from OP decoder 64 to be applied to discrete ones of OR circuits $O_8$–$O_{14}$ to accomplish the conditioning of only the gates through which the new microinstruction address bits are to pass. For instance, only the low order bit in the current address field of the "move" microinstruction is occupied by a next microinstruction address bit. For this reason, the "move" OP decoder output line 70 feeds only into OR circuit $O_8$ which in turn conditions gate $G_8$ to pass the new address bit. On the other hand, "add" OP code output line 68 feeds into OR circuits $O_8$–$O_{11}$ due to the fact that the four low order bits of its current address field are occupied by next address bits. The outputs from OR circuits $O_8$–$O_{11}$ condition corresponding gates $G_8$–$G_{11}$ to pass the new address bits, and, of course, the "branch" output line 66 feeds via OR circuits $O_8$–$O_{14}$ to condition all gates $G_8$–$G_{14}$ due to the fact that its entire current address field is occupied by the next microinstruction address bits. Some OP code output lines (not shown) such as the "fetch" OP code, will feed into no OR circuits due to the fact that they contain no next address bits in their current address fields.

OR circuits $O_8$–$O_{14}$, in addition to controlling which new microinstruction bits are gated into address register 78, also control which address bits from the present microinstruction are retained. When one of OR circuits $O_8$–$O_{14}$ produces an output, indicating that a new address bit is to be inserted into the address register 78, the respectively connected reset gate $G_{R8}$–$G_{R14}$ is conditioned to pass a reset pulse. Any of reset gates $G_{R8}$–$G_{R14}$ which are not so conditioned prevent their corresponding register positions from being impulsed by a reset signal. In this manner only those address register positions which are to receive new addres bits are reset, while those not receiving new address bits retain their present address bit states.

Once the entire next microinstruction address is inserted into address register 78, a read ROS gating signal is applied via conductor 84 to decoder and gates 86 which in turn decodes the binary address and accesses the corresponding specific memory position in ROS 30.

No mention has been made of the specific circuitry contained within the registers, gates, decoders, etc., for the reason that many alternative circuits are available to fulfill the desired purposes. For instance, the address register may contain any binary element which is adapted to be reset, e.g., binary triggers, magnetic cores, etc.

Turning now to a description of the operation of the circuit in FIG. 3, it will be assumed that a next microinstruction address resides in address register 78. First, a "Read ROS" signal is applied via conductor 84 to decoder and gates 86, which, in turn, access a specific microinstruction stored in ROS 30. This causes the microinstruction to be read out into data register 50. As soon as the new microinstruction has been read into data register 50, its OP code is automatically decoded in OP decoder 64 and one of the output lines from OP decoder 64 becomes energized. Assuming that it is the "add" OP output line 68 which is energized, OR circuits $O_8$–$O_{11}$ will produce conditioning outputs to gates $G_{R8}$–$G_{R11}$. These gates will thereby be conditioned to allow the reset signal to reset address register positions 8–11 in preparation for the new next address bits 8–11 now held in data register 50. Address register positions 12–14 will not be reset because gates $G_{R12}$–$G_{R14}$ are deconditioned due to the low outputs from OR circuits $O_{12}$–$O_{14}$.

Next, a reset signal is applied via reset conductor 80 and resets binary positions 1–11 in address register 78 thereby readying them for the new microinstruction address bits. Address positions 12–14 retain their presently held address manifestations.

Next, a conditioning potential is applied via gating conductor 56 to a data register gates 52 thereby allowing the contents of address register 50 to be applied to cables 36 and 37. The seven low order bits contained in address register 50 are automatically inserted into address register 78 while the seven high order bits are applied as inputs to gates $G_8$–$G_{14}$. The energized outputs from OR circuits $O_8$–$O_{11}$ condition gates $G_8$–$G_{11}$ to pass the bits respectively applied thereto. Gates $G_{12}$–$G_{14}$ are not conditioned and therefore the bits applied thereto are prevented from reaching address register 78. This is the desired result, since, as can be seen from FIG. 2, these bits correspond to a current address and not to a portion of the next microinstruction address. The bits gated through gates $G_8$–$G_{11}$ are applied via cable 82 to bit positions 8–11 in address register 78 causing the binary triggers therein to assume corresponding states. Binary triggers 12–14 remain in the state they were placed into for the previous microinstruction address. Next, the data register is reset via an input applied to conductor 51 and the cycle is repeated.

While the invention has been particularly shown and described with reference to a preferred embodiment thereof, it will be understood by those skilled in the art that various changes in form and detail may be made therein without departing from the spirit and scope of the invention.

What is claimed is:

1. In a data processing system:

storage means provided with a plurality of storage positions each adapted to retain an instruction of predetermined length and including a variable-length current instruction and at least a segment of the address of the next instruction, said current instruction containing an operation code indicating the length of said next instruction address or segment thereof;

an input register adapted to store a current instruction address and to access the storage position within said storage means designated by said current instruction address;

an output register adapted to receive a preset instruction from said storage means upon it being accessed by said input register;

a decoder connected to said output register for decoding the operation code portion of said current instruction to determine the length of said next instruction address or segment thereof and for producing a control signal in accordance with said determination;

gating means connected between said output register and said input register and responsive to said control signal to gate from said output register into said input register only the next instruction address or segment thereof; and means responsive to a control signal indicating that only a segment of a next instruction address is contained in said current instruction to cause to be retained in said input register the portion of the current instruction address stored therein and which is not replaced by the transfer of said next instruction address segment.

2. In a data processing system:

storage means provided with a plurality of storage positions each adapted to retain a predetermined length instruction including two fields of variable length, one field containing a current instruction and another field, the address or a portion thereof of the next instruction, a segment of said current instruction indicating the field length of said next instruction address, the addressing power of an instruction being dependent upon the length of said next instruction address field whereby the longer said field the greater the number of addressable storage positions;

an address register adapter to store a current address and to access a position wtihin said storage means designated by said current address;

a data register adapted to receive a current instruction from said storage means upon it being accessed by said address register;

a decoder connected to said data register for examining said segment of said current instruction field to determine the length of said next address field and having a plurality of output lines and including means for energizing one of said output lines if the field length of said next instruction address field is determined to be less than maximum;

first gating means connected between said address register and said data register and responsive to the energization of a decoder output line to gate from said data register into said address register only the next instruction address field of the current instruction contained in said data register; and second gating means responsive to the energization of a decoder output line to cause to be retained in said address register the portion of the current address stored therein which is not replaced by the gating of said next instruction address field from said data register.

3. In a data processing system:

a memory having a plurality of storage positions each adapted to retain an instruction of predetermined length and including a variable-length current instruction and at least a segment of the address of the next instruction, said current instruction containing an operation code indicating the length of said next instruction address or segment thereof;

first means to store a current instruction address and to access the storage position within said memory designated by said current instruction address;

second means to receive a present instruction from said memory upon it being accessed by said first means;

third means connected to said second means for decoding the operation code portion of said current instruction to determine the length of said next instruction address or segment thereof and for producing a control signal in accordance with said determination;

fourth means connected between said second means and said first means and responsive to said control signal to gate from said second means into said first means only the next instruction address or segment thereof; and fifth mean responsive to a control signal indicating that only a segment of a next instruction address is contained in said current instruction to cause to be retained in said first means the portion of the current instruction address stored therein and which is not replaced by the transfer of said next instruction address segment.

4. In a data processing system:

a memory having a plurality of storage positions each adapted to retain a predetermined-length instruction including two fields of variable length, one of said fields containing a current instruction and another of said fields containing the address or a portion thereof of the next instruction, a segment of said current instruction indicating the field length of said next instruction address, the addressing power of an instruction being dependent upon the length of said next instruction address field whereby the longer said field the greater the number of addressable storage positions;

first means to store a current address and to access a position within said memory designated by said current address;

second means to receive a current instruction from said memory upon the latter being accessed by said first means;

third means connected to said second means for examining said segment of said current instruction field to determine the length of said next address field and having a plurality of output lines and including means for energizing one of said output lines if the field length of said next instruction address field is determined to be less than maximum;

fourth means connected between said first means and said second means and responsive to the energization of an output line to gate from said second means into said first means only the next instruction address field of the current instruction contained in said second means; and fifth means responsive to the energization of an output line to cause to be retained in said first means the portion of the current address stored therein which is not replaced by the gating of said next instruction address field from said second means.

5. In a data processing system:

a memory having a plurality of storage positions each adapted to retain an instruction of predetermined length and including a variable-length current instruction and at least a segment of the address of the next instruction:

first means to store a current instruction address and to access the storage position within said memory deignated by said current instruction address;

second means to receive a present instruction from said memory upon it being accessed by said first means;

third means to determine the length of said next instruction address or segment thereof and for producing a control signal in accordance with said determination;

fourth means connected between said second means and said first means and responsive to said control signal to gate from said second means into said first means only the next instruction address or segment thereof; and fifth means responsive to a control signal indicating that only a segment of a next instruction address is contained in said current instruction to cause to be retained in said first means the portion of the current instruction address stored therein and which is not replaced by the transfer of said next instruction address segment.

6. In a data processing system:

a memory having a plurality of storage positions each adapted to retain a predetermined-length instruction including two fields of variable length, one of said fields containing a current instruction and another of said fields containing the address or a portion thereof of the next instruction, first means to store a current address and to access a position within said memory designated by said current address;

second means to receive a current instruction from said memory upon the latter being accessed by said first means;

third means to determine the length of said next address field and having a plurality of output lines and including means for energizing one of said output lines if the field length of said next instruction address field is determined to be less than maximum;
fourth means connected between said first means and said second means and responsive to the energization of an output line to gate from said second means into said first means only the next instruction address field of the current instruction contained in said second means; and
fifth means responsive to the energization of an output line to cause to be retained in said first means the portion of the current address stored therein which is not replaced by the gating of said next instruction address field from said second means.

7. In a data processing system:
a memory having a plurality of storage positions each adapted to retain a predetermined-length instruction including two fields of variable length, one of said fields containing a current instruction and another of said fields containing the address or a portion thereof of the next instruction, a segment of said current instruction indicating the field length of said next instruction address, the addressing power of an instruction being dependent upon the length of said next instruction address field whereby the longer said field the greater the number of addressable storage positions;
first means to store a current address and to access a position within said memory designated by said current address;
second means to receive a current instruction from said memory upon the latter being accessed by said first means;
third means connected to said second means for examining said segment of said current instruction field to determine the length of said next address field;
fourth means connected between said first means and said second means and responsive to said field length determination to gate from said second means into said first means only the next instruction address field of the current instruction contained in said second means; and
fifth means responsive to said field length determination to cause to be retained in said first means the portion of the current address stored therein which is not replaced by the gating of said next instruction address field from said second means.

8. In a data processing system:
a memory having a plurality of storage positions each adapted to retain a word of predetermined length and including a variable-length portion and at least a segment of the address of the next word, said portion containing a code indicating the length of said next word address or segment thereof;
first means to store a current word address and to access the storage position within said memory designated by said address;
second means to receive a current word from said memory upon it being accessed by said first means;
third means connected to said second means for decoding the code of said portion to determine the length of said next word address or segment thereof and for producing a control signal in accordance with said determination.
fourth means connected between said second means and said first means and responsive to said control signal to gate from said second means into said first means only the next word address or segment thereof; and
fifth means responsive to a control signal indicating that only a segment of a next word address is contained in said current word to cause to be retained in said first means the portion of the current word address stored therein and which is not replaced by the transfer of said next word address segment.

9. In a data processing system:
a memory having a plurality of storage positions each adapted to retain a predetermined-length word including two fields of variable length, one of said fields containing a current word and another of said fields containing the address or a portion thereof of the next word, a segment of said current word indicating the field length of said next word address, the addressing power of a word being dependent upon the length of said next word address field whereby the longer said field the greater the number of addressable storage positions;
first means to store a current address and to access a position within said memory designated by said current address;
second means to receive a current word form said memory upon the latter being accessed by said first means;
third means connected to said second means for examining said segment of said current word field to determine the length of said next address field and having a plurality of output lines and including means for energizing one of said output lines if the field length of said next word address field is determined to be less than maximum;
fourth means connected between said first means and said second means and responsive to the energization of an output line to gate from said second means into said first means only the next word address field of the current word contained in said second means; and
fifth means responsive to the energization of an output line to cause to be retained in said first means the portion of the current address stored therein which is not replaced by the gating of said next word address field from said second means.

10. In a data processing system:
storage means provided with a plurality of storage positions each adapted to retain an instruction of predetermined length and including a variable-length current instruction and at least a segment of the address of the next instruction;
an input register adapted to store a present instruction address and access the storage position within said storage means designated by said present instruction address;
an output register adapted to receive a current instruction from said storage means upon it being accessed by said input register;
means to determine the length of said next instruction address or segment thereof and for producing a control signal in accordance with said determination;
gating means connected between said output register and said input register and responsive to said control signal to gate from said output register into said input register only the next instruction address or segment thereof; and
means responsive to a control signal indicating that only a segment of a next instruction address is contained in said current instruction to cause to be retained in said input register the portion of the current instruction address stored therein and which is not replaced by the transfer of said next instruction address segment.

11. In a data processing system:
storage means provided with a plurality of storage positions each adapted to retain a predetermined length instruction including two fields of variable length, one of said fields containing a current instruction and another of said fields containing the address or a portion thereof of the next instruction;
an address register adapted to store a current address and to access a position within said storage means designated by said current address;
a data register adapted to receive a present instruction from said storage means upon it being accessed by said address register;
means to determine the length of said next address field and for energizing one of a plurality of output lines if the field length of said next instruction address field is determined to be less than maximum;

first gating means connected between said address register and said data register and responsive to the energization of said output line to gate from said data register into said address register only the next instruction address field of the present instruction contained in said data register; and second gating means responsive to the energization of an output line to cause to be retained in said address register the portion of the present address stored therein which is not replaced by the gating of said next instruction address field from said data register.

12. In a data processing system, a control device comprising:

storage means provided with a plurality of storage positions, each storage position adapted to retain a microinstruction of predetermined length, a microinstruction comprising a variable length current instruction and at least a segment of the address of the next microinstruction, said current instruction containing an operation code which indicates the length of said next address or segment thereof;

an input register adapted to a store a present microinstruction address and access the storage position within said storage means designated by said present microinstruction address;

an output register adapted to receive a present microinstruction from said storage means upon it being accessed by said input register;

a decoder connected to said output register for decoding the operation code portion of said present microinstruction to determine the length of said next microinstruction address or segment thereof and for producing a control signal in accordance with said determination;

gating means connected between said output register and said input register and responsive to said control signal to gate from said output register into said input register only the next microinstruction address or segment thereof; and means responsive to a control signal indicating that only a segment of a next microinstruction address is contained in said present microinstruction to cause to be retained in said input register the portion of the present microinstruction address stored therein which is not replaced by the transfer of said next microinstruction address segment.

13. In a data processing system, a control device comprising:

storage means provided with a plurality of storage positions, each storage position adapted to retain a predetermined length microinstruction, a microinstruction including two fields of variable length, one field containing a current instruction and another field, the address or a portion thereof of the next microinstruction, a segment of said current instruction indicating the field length of said next microinstruction address, the addressing power of a microinstruction being dependent upon the length of said next microinstruction address field, the longer said field, the greater the number of addressable storage positions;

an address register adapted to store a present address and access a position within said storage means designated by said present address;

a data register adapted to receive a present microinstruction from said storage means upon it being acessed by said address register;

a decoder connected to said data means for examining said segment of said current instruction field to determine the length of said next address field and for energizing one of a plurality of output lines if the field length of said next instruction address field is determined to be less than maximum;

first gating means connected between said address register and said data register and responsive to the energization of a decoder output line to gate from said data register into said address register only the next microinstruction address field of the present microinstruction contained in said data register; and second gating means responsive to the energization of a decoder output line to cause to be retained in said address register the portion of the present address stored therein which is not replaced by the gating of said next microinstruction address field from said data register.

References Cited

UNITED STATES PATENTS

| | | | |
|---|---|---|---|
| 3,223,982 | 12/1965 | Sacerdoti et al. ---- | 340—172.5 |
| 3,248,708 | 4/1966 | Haynes ----------- | 340—172.5 |
| 3,258,748 | 6/1966 | Schneberger et al. -- | 340—172.5 |
| 3,275,989 | 10/1966 | Glaser et al. ------ | 340—172.5 |

PAUL J. HENON, *Primary Examiner.*

ROBERT C. BAILEY, *Examiner.*

J. P. VANDENBURG, *Assistant Examiner.*